UNITED STATES PATENT OFFICE.

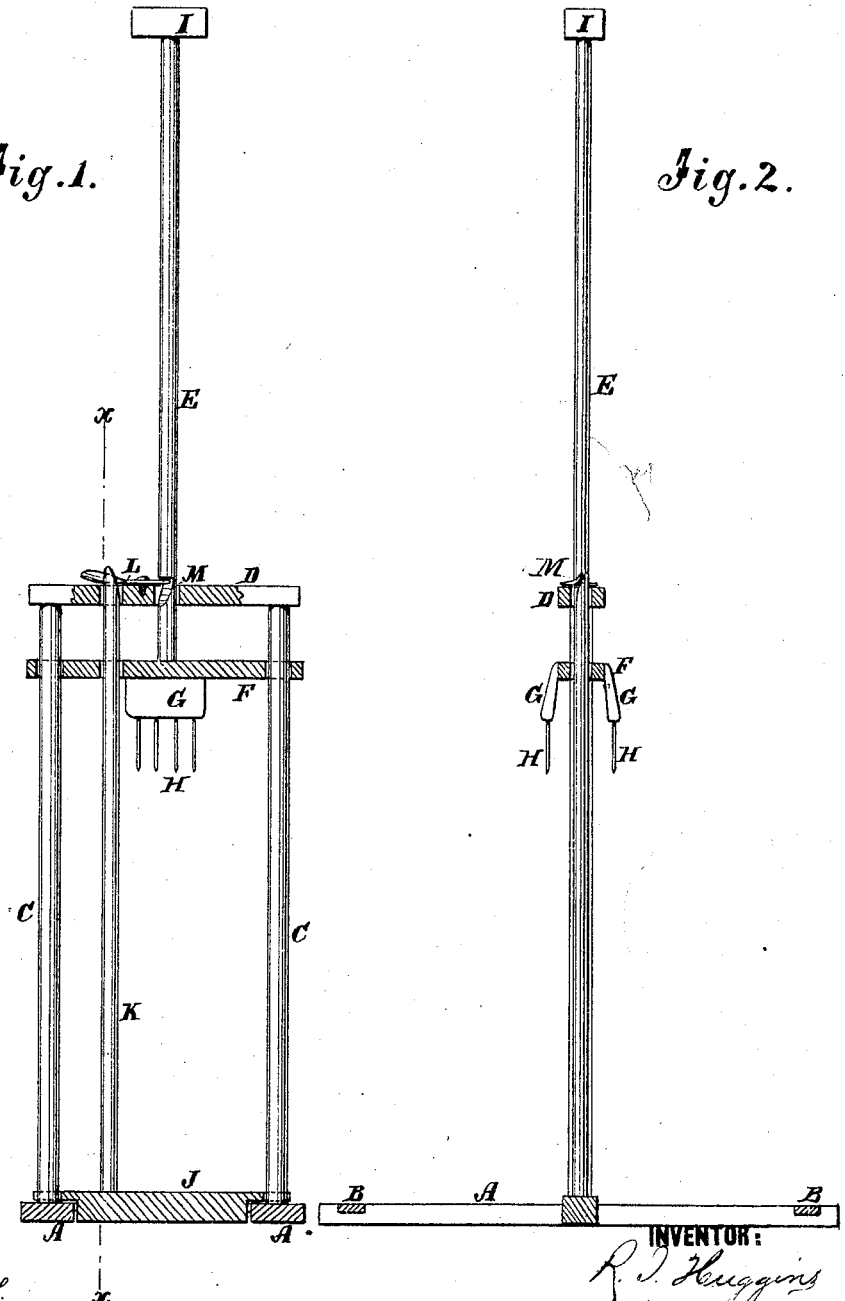

ROBERT I. HUGGINS, OF BETHEL, OHIO.

IMPROVEMENT IN MOLE-TRAPS.

Specification forming part of Letters Patent No. 146,003, dated December 30, 1873; application filed November 1, 1873.

*To all whom it may concern:*

Be it known that I, ROBERT I. HUGGINS, of Bethel, in the county of Clermont and State of Ohio, have invented a new and useful Improvement in Mole-Traps, of which the following is a specification:

The invention will first be fully described, and then pointed out in the claims.

In the accompanying drawing, Figure 1 is an elevation, showing the trap set. Fig. 2 is a vertical section of Fig. 1, taken on the line $x\, x$.

Similar letters of reference indicate corresponding parts.

A A represent two sill-pieces, connected together by cross-ties B B. C C are two uprights, which are rigidly attached to the middle of the sills A A. These uprights are connected together by the top cross-piece D. E is an upright rod, which passes loosely through the cross-piece D, and is attached at its lower end to cross-head F, which slides up and down on the uprights C C. Projecting from the lower side of this cross-head are two wings, G G, each provided with a row of wire teeth, H H. I is a weight on the central rod E. J is a cross-piece, which extends from one to the other of the uprights C C. Its ends are rabbeted, as seen in Fig. 1, so that its lower side is flush with the lower sides of the sills. K is a rod rigidly attached to this cross-piece. This rod extends up through the cross-head and top piece D loosely. The rod E is held up when the trap is set by means of a little button-lever, L, which enters a notch, $m$, in the rod. The upper end of the rod K is cut to an angle or beveled off on one side, so that when it is raised it will bear against and throw back the opposite end of the lever L, and detach it from the notch M. When this is done the rod and cross-head drop, and the teeth H secure the prey.

The mole burrows near the surface of the ground. To locate the trap, the earth is pressed gently down, so as to fill the burrow, and the trap is set directly above, with the sill-pieces A A parallel with the burrow, and with the cross-piece J on such depression. The mole, finding its hole obstructed, will commence repairing damages, and in forcing its body through the old track the cross-piece J will be raised, which will raise the rod K, and this, acting on the lever L, will release the rod E, and the cross-head will drop with the teeth on each side of the cross-piece J. The teeth penetrate the ground and spear the mole.

With this trap the ground may soon be cleared of these little pests.

Having thus described my invention, I claim as new and desire to secure by Letters Patent—

1. A mole-trap constructed substantially as shown and described—that is, having sill or foundation pieces A A, uprights C C, notched falling rod and cross-head E F, cross-piece J, tripping-rod K, and button-lever L, all arranged to operate substantially as shown and described.

2. The notch M, button-lever L, and rod K, in combination, as and for the purposes described.

ROBERT I. HUGGINS.

Witnesses:
JOHN T. HUGGINS,
S. N. CHANNELL.